(12) United States Patent
Bainbridge et al.

(10) Patent No.: US 6,256,867 B1
(45) Date of Patent: Jul. 10, 2001

(54) APPARATUS FOR ASSEMBLING SEATBELT WEBBING WITH A SILL-END BRACKET

(75) Inventors: Douglas Bainbridge; John Hodgson; Paul Slack; Paul Henderson; Simon Wise; Antony Weedall, all of Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/516,834

(22) Filed: Mar. 1, 2000

(30) Foreign Application Priority Data

Nov. 22, 1999 (GB) .................................... 9927602

(51) Int. Cl.[7] .................................... B23P 21/00
(52) U.S. Cl. ................ 29/709; 29/714; 29/715; 29/407.01; 29/24.1; 269/329; 242/615.3
(58) Field of Search ............... 29/407.01, 709, 29/714, 715, 241; 269/329; 242/615.3; 297/472

(56) References Cited

U.S. PATENT DOCUMENTS 3,785,907 * 1/1974 Barr et al. ........................... 156/443
3,898,119 8/1975 Barr et al. ........................... 156/202
4,137,856 2/1979 Brauns et al. ....................... 112/104
4,673,195 * 6/1987 Boyd et al. ......................... 280/801
5,319,834 * 6/1994 Voigts ................................. 29/426.4

* cited by examiner

Primary Examiner—S. Thomas Hughes
Assistant Examiner—John C. Hong
(74) Attorney, Agent, or Firm—Lonnie Drayer

(57) ABSTRACT

An apparatus for assembling seatbelt webbing with a sill-end bracket has a form-feeding member with a tapered channel for receiving one end of a length of seatbelt webbing on an assembly line. A webbing pull-through member engages one end of the webbing. A bracket sensor senses the presence of a bracket at a correct position in the bracket support. Means responsive to a signal from a sensor may be provided for indicating the correct positioning of the sill-end bracket for feeding the pull-through member through the sill-end bracket. Means for driving the webbing into the tapered channel are provided so that said one end is located at a predetermined position relative to the form-feeding member. A method of manual or automatic assembling seatbelt webbing with a sill-end bracket is also disclosed.

11 Claims, 3 Drawing Sheets

APPARATUS FOR ASSEMBLING SEATBELT WEBBING WITH A SILL-END BRACKET

FIELD OF THE INVENTION

The present invention relates to an apparatus for assembling a vehicle safety restraint, particularly a seatbelt.

BACKGROUND OF THE INVENTION

A seatbelt system generally comprises a single piece of elongate webbing fixed at three points so that it passes across both the lap and diagonally across the torso a vehicle occupant. The seatbelt is fixed to the vehicle chassis on each side of the seat and is fixed to the side of the vehicle above the vehicle occupant's shoulder, usually to a load-bearing pillar of the vehicle known in the industry as the "B-pillar". To provide flexibility at the fixing point and allow the belt to adapt to different sizes and shapes of vehicle occupants, the webbing is fixed to the B-pillar by a pivotally mounted bracket known as a sill-end bracket. The sill end bracket is sometimes referred to as a D-ring because it has a shape reminiscent of a side oriented letter "D". The webbing passes through a slit-shaped hole in the sill-end bracket (D-ring) and over a generally horizontal bar formed by the vertical line of the "D". The sill-end bracket is mounted to the vehicle by a bolt that allows the bracket to pivot to set the webbing at the correct orientation for the vehicle occupant being restrained without twisting or pinching the webbing.

On the assembly line the webbing and sill-end bracket (D-ring) must be assembled together by passing the webbing through the hole in the bracket. Traditionally this is done manually and there is considerable waste due to operator error since the operation is difficult. It is desired to increase the speed and efficiency of the assembly line.

SUMMARY OF THE INVENTION

According to one aspect of the present invention there is provided an apparatus for assembling seatbelt webbing with a sill-end bracket, the apparatus comprising: a form feeding member having a tapered channel for receiving one end of a length of seat belt ebbing on an assembly line; a webbing pull-through member having means for engaging one end of the webbing; a support for the sill-end bracket; and a bracket sensor for sensing the presence of the sill-end bracket at a correct position in the bracket support.

Preferably the apparatus further comprises means responsive to a signal from the sensor indicating the correct positioning of the sill-end bracket.

Means are also provided for driving the webbing into the tapered channel, preferably so that said one end is located at a predetermined position, relative to the form-feeding member. There may also be provided means for activating the pull-through member to engage the webbing and to drive the pull-through member back.

Preferably the pull-through member is associated with a sensor for sensing when the pull-through member is at a predetermined position dependent on the required webbing fold-over length.

According to a second aspect of the invention, a method for assembling seatbelt webbing with an opening in a sill-end bracket comprises the steps of: placing the sill-end bracket in a bracket support; feeding a webbing pull-through member through an opening in the sill-end bracket; driving one end of a length of seat belt webbing into the wide part of a tapered channel of a feeding member; sensing when the webbing is at a predetermined position; activating the pull-through member to engage the end of the webbing; pulling the pull-through member back, through the sill-end bracket to pull the webbing through the form feeding member channel and through the sill-end bracket. Preferably, it is pulled back to a predetermined position, sensed by a sensor and arranged in dependence of the required webbing fold-over length.

An apparatus and method according to the present invention can ensure that the sill-end of the webbing is in the correct position and orientation, and that the webbing fold-over is in the correct orientation of the desired length and of the required fold-over form. Preferably the whole operation is automated but many of the steps can be performed manually with an improvement in efficiency nonetheless. The number of operators on the assembly line may be reduced and operator errors can be substantially reduced or even eliminated. Thus speed and efficiency of the assembly line may be of enhanced and the resulting product of a more consistently reliable quality.

BRIEF DESCRIPTION OF THE DRAWINGS

For a better understanding of the present invention and to show how the same may be carried into effect, reference will now be made to the accompanying drawings in which.

DETAILED DESCRIPTION OF THE INVENTION

Figure 1:
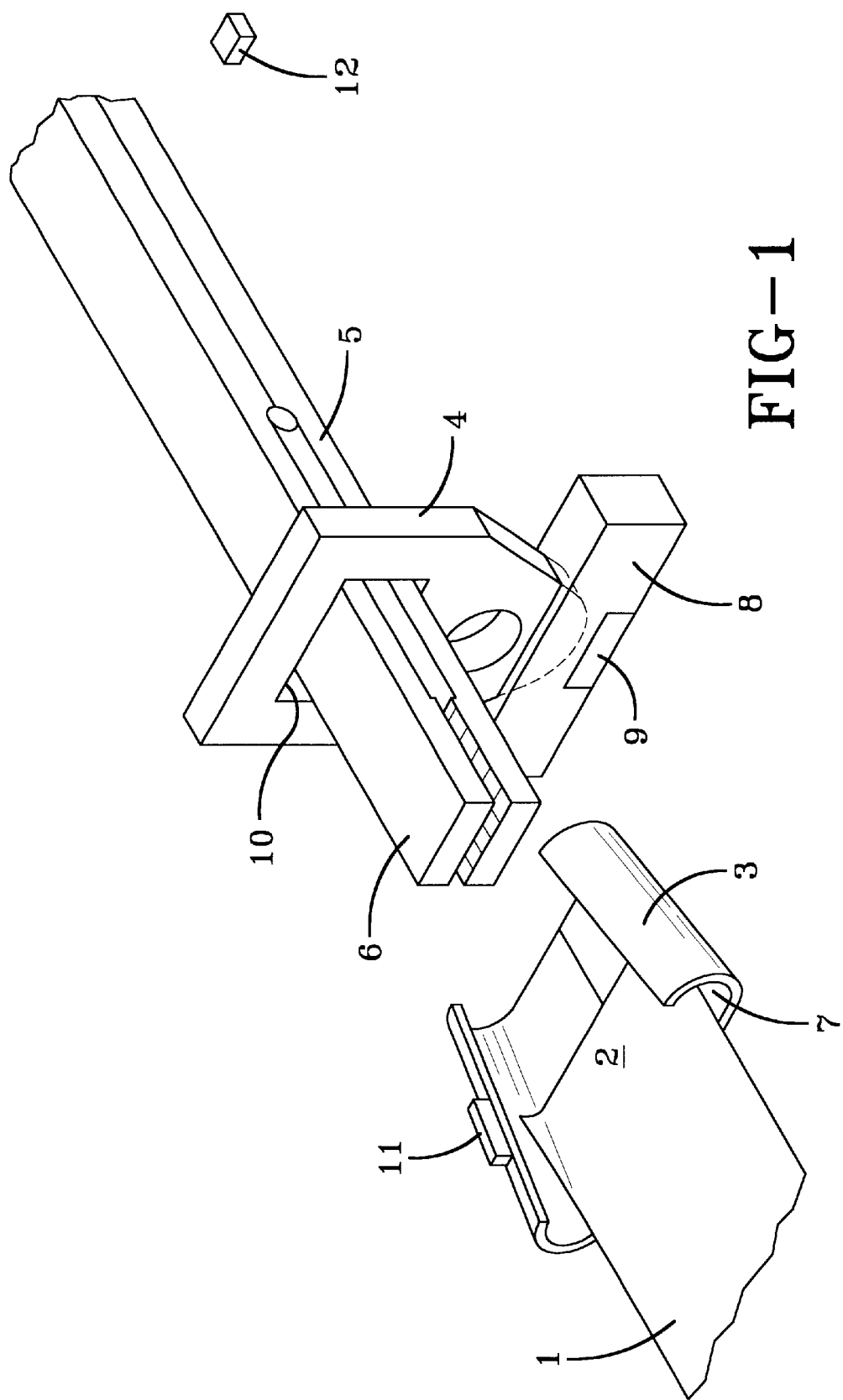
FIG. 1 is a schematic perspective view of apparatus according to the first aspect of the invention at an early stage of a method according to the second aspect of the invention.

In the figures a length of seatbelt webbing 1 has an end 2. A form feeding horn 3 has a tapered internal channel 7. A sill-end bracket 4 has a slot 10 therein. A webbing pull-through device 5 has hinged jaws 6 at one end for gripping the end 2 of the webbing 1.

Figure 2:
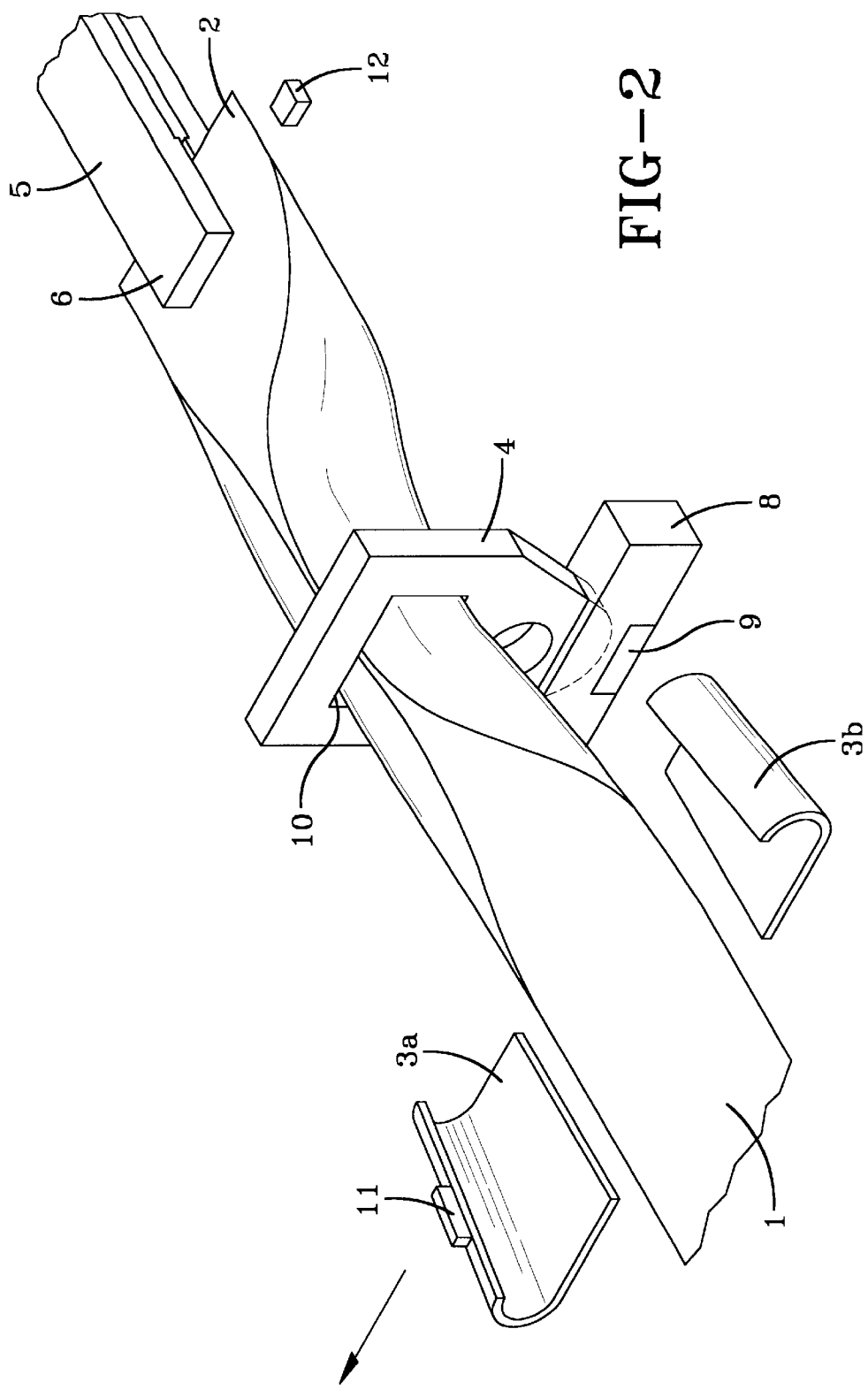
FIG. 2 is a schematic perspective view of apparatus of the first aspect of the invention at an intermediate stage of a method according to the second aspect of the invention.

The form feeding horn 3 is formed in two parts and is shown in FIG. 1 in a closed position with the two parts fixed together and in FIG. 2 in an open position with the two parts separated to facilitate its removal from the assembly.

The sill-end bracket 4 is held in a holding member 8 that is fitted with a sensor 9 to detect the correct positioning of the sill-end bracket 4. Once the sensor 9 indicates that the sill-end bracket is correctly positioned the apparatus feeds the pull-through device 5 through the slot 10 in the sill-end bracket. The end 2 of the webbing 1 is fed into the channel 7 of form feeding horn 3 up to a predetermined position which is sensed by a second sensor 11. When the pull-through device and the webbing are in the correct positions the pull-through device is activated to grip the end 2 of webbing 1 between the jaws 6. The pull-through device 5 is then drawn back through the sill-end bracket 4 thus drawing the webbing 1 through the tapered channel 7 of form feeding horn 3. The tapered channel rolls both of the sides of the webbing over by equal amounts toward the centerline of the webbing as shown in FIGS. 2 and 3.

The pull-through member is retracted to a predetermined position that is detected by sensor 12 and can be adjusted depending on the required webbing fold-over length. The pull-through member is then stopped and the jaws 6 disengage the end 2 of the webbing. The two parts 3a, 3b of form feeding horn 3 are pulled apart as shown in FIG. 2 to remove the horn from the assembly. The sill-end bracket 4 is removed from the holding member 8 and the assembly is ready for the next stage of the production process.

Of course some of the steps may be performed manually rather than completed automatically. The sensors 9, 11, 12 may be arranged to provide visual and/or audio prompts to an operator. An improvement in the efficiency of the assembly line will nonetheless be observed because the form feeding horn facilitates the correct fold-over orientation for the webbing and use of the pull-through member allows an accurate fold-over length to be determined.

Figure 3:
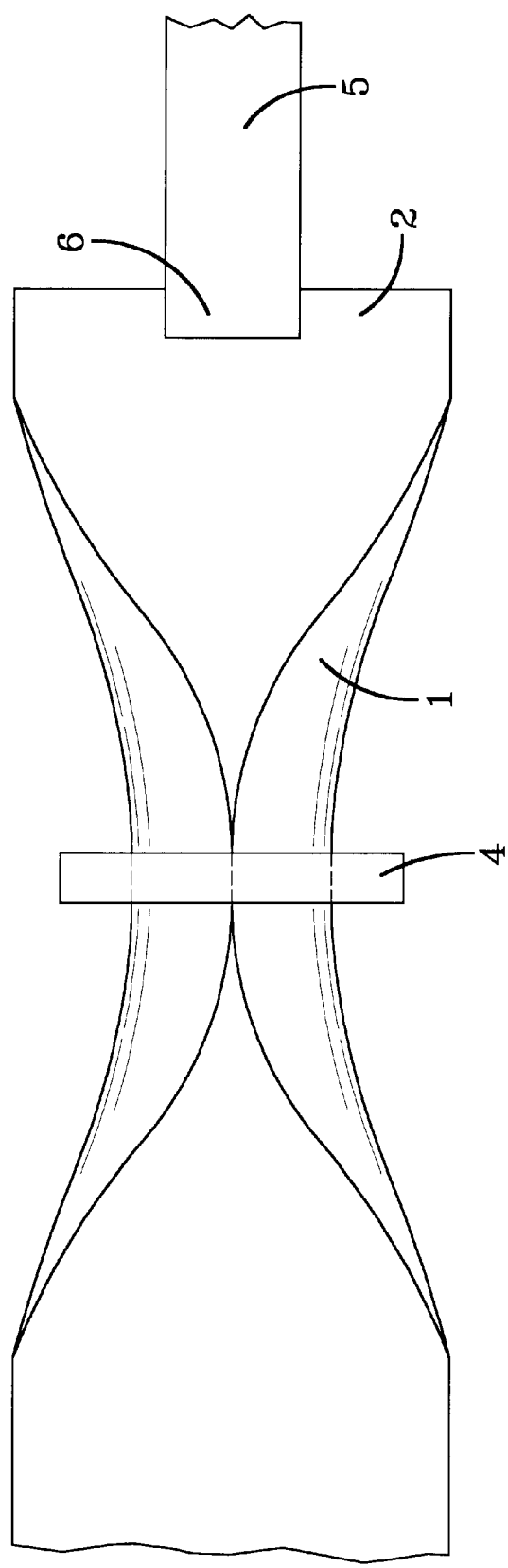
FIG. 3 is a top plan view of seatbelt webbing and a sill-end bracket assembled using the apparatus of FIGS. 1 and 2.

The top-plan view in FIG. 3 shows the webbing 1 passed through the sill-end bracket 4 and still attached to the pull-through member 5 by jaws 6. It clearly illustrates how the webbing is folded generally equally from each side, this being the correct webbing fold-over form for the webbing to pass easily through the sill-end bracket hole and thus for consistent performance of the complete assembly of the webbing and sill-end bracket.

It is understood that the invention is not limited to the particular apparatus and methods herein illustrated and described, but embraces such modified forms thereof as may come within the scope of the following claims.

We claim:

1. An apparatus for assembling seatbelt webbing with a sill-end bracket, the apparatus comprising:

a form feeding member having a tapered channel for receiving one end of a length of seatbelt webbing on an assembly line;

a support for the sill-end bracket;

a bracket sensor for sensing the presence of the sill-end bracket at a correct position in the bracket support;

a pull through member for pulling the seatbelt webbing through the sill-end bracket; and a means responsive to a signal from the bracket sensor indicating the correct positioning of the sill-end bracket for feeding the pull-through member through the sill-end bracket.

2. The apparatus for assembling seatbelt webbing with a sill-end bracket according to claim 1 further comprising means for driving the webbing into the tapered channel.

3. The apparatus for assembling seatbelt webbing with a sill-end bracket according to claim 1 further comprising means for driving the webbing into the tapered channel.

4. The apparatus for assembling seatbelt webbing with a sill-end bracket according to claim 2 wherein said driving means is arranged to drive the webbing into the channel so that said one end is located at a predetermined position relative to the form feeding member.

5. The apparatus for assembling seatbelt webbing with a sill-end bracket according to claim 3 wherein said driving means is arranged to drive the webbing into the channel so that said one end is located at a predetermined position relative to the form feeding member.

6. The apparatus for assembling seatbelt webbing with a sill-end bracket according to claim 1 further comprising means for activating the pull-through member to engage the webbing and to drive the pull-through member back.

7. The apparatus for assembling seatbelt webbing with a sill-end bracket according to claim 4 further comprising means for activating the pull-through member to engage the webbing and to drive the pull-through member back.

8. The apparatus for assembling seatbelt webbing with a sill-end bracket according to claim 5 further comprising means for activating the pull-through member to engage the webbing and to drive the pull-through member back.

9. The apparatus for assembling seatbelt webbing with a sill-end bracket according to claim 1 further comprising a sensor associated with the pull-through member for sensing when the pull-through member is at predetermined position dependent on a required webbing fold-over length.

10. The apparatus for assembling seatbelt webbing with a sill-end bracket according to claim 7 further comprising a sensor associated with the pull-through member for sensing when the pull-through member is at predetermined position dependent on a required webbing fold-over length.

11. The apparatus for assembling seatbelt webbing with a sill-end bracket according to claim 8 further comprising a sensor associated with the pull-through member for sensing when the pull-through member is at predetermined position dependent on a required webbing fold-over length.

* * * * *